United States Patent [19]

Lindtveit

[11] Patent Number: 4,952,311
[45] Date of Patent: Aug. 28, 1990

[54] FUEL OIL FILTER ELEMENT

[75] Inventor: Herbert Lindtveit, West Hempstead, N.Y.

[73] Assignee: Sid Harvey, Inc., Valley Stream, N.Y.

[21] Appl. No.: 366,200

[22] Filed: Jun. 9, 1989

Related U.S. Application Data

[63] Continuation of Ser. No. 148,287, Jan. 29, 1988, abandoned, which is a continuation of Ser. No. 38,045, Apr. 14, 1987, abandoned, which is a continuation of Ser. No. 713,299, Mar. 18, 1985, abandoned, which is a continuation-in-part of Ser. No. 538,267, Oct. 3, 1983, abandoned.

[51] Int. Cl.$^5$ ...................... B01D 27/07; B01D 27/08
[52] U.S. Cl. .................................. 210/232; 210/452; 210/455; 210/493.5; 210/497.01
[58] Field of Search .................. 55/521, 529; 210/232, 210/238, 452, 455, 488, 493.5, 497.01; 264/DIG. 48

[56] References Cited

U.S. PATENT DOCUMENTS

| | | | |
|---|---|---|---|
| 2,017,350 | 10/1935 | Morgan | 210/452 |
| 2,486,389 | 11/1949 | Clark | 210/452 |
| 2,543,481 | 2/1951 | Wicks | 210/452 |
| 2,731,152 | 1/1966 | Redner | 210/488 |
| 2,770,426 | 11/1956 | Sievers | 210/497.01 |
| 2,781,913 | 2/1957 | Thompson | 55/529 |
| 3,050,193 | 8/1962 | Gillick | 210/497 J |
| 3,298,672 | 1/1967 | Fordyce | 210/452 |
| 3,321,088 | 5/1967 | Williamitis | 210/497.01 |
| 3,352,423 | 11/1967 | Osterman | 210/496 |
| 3,486,626 | 12/1969 | Close | 55/521 |
| 4,072,616 | 2/1978 | Rohlig | 210/493.5 |
| 4,116,845 | 9/1978 | Swank | 210/455 |
| 4,497,706 | 2/1985 | Pickett | 210/455 |

FOREIGN PATENT DOCUMENTS

| | | | |
|---|---|---|---|
| 275665 | 12/1962 | Australia | 210/497.01 |
| 679886 | 7/1939 | Fed. Rep. of Germany | 55/529 |
| 55-113371 | 10/1978 | Japan | 264/DIG. 48 |
| 1484669 | 9/1977 | United Kingdom | 55/521 |

Primary Examiner—Ernest G. Therkorn
Attorney, Agent, or Firm—Cooper & Dunham

[57] ABSTRACT

Disclosed is a replaceable fuel filter of one integral piece of extruded, compressible filter material, cut only at its ends and provided with a plurality of longitudinally extending flutes.

4 Claims, 1 Drawing Sheet

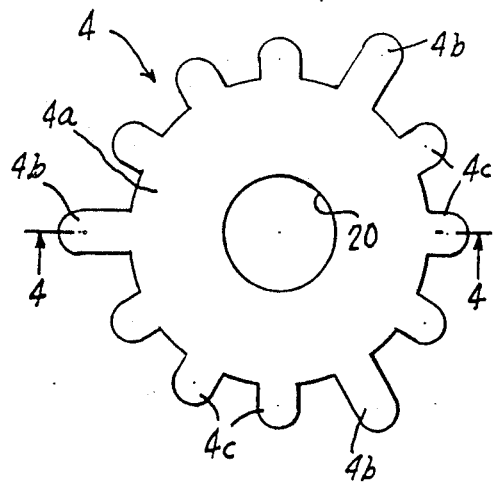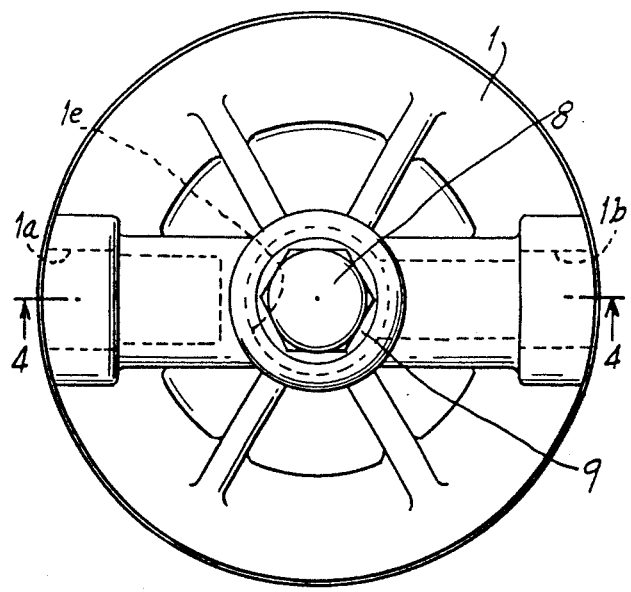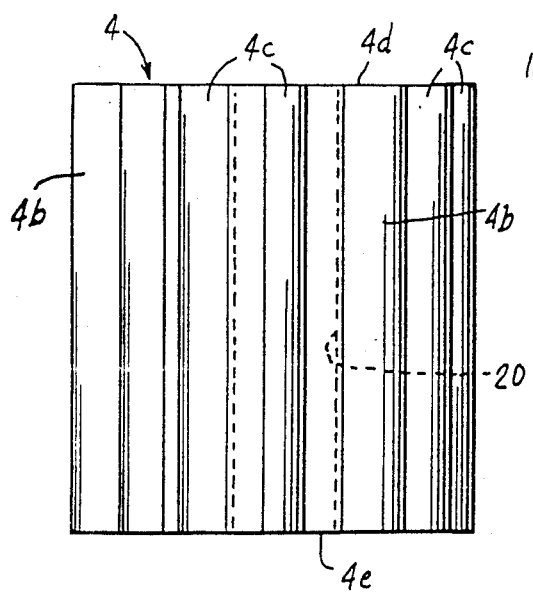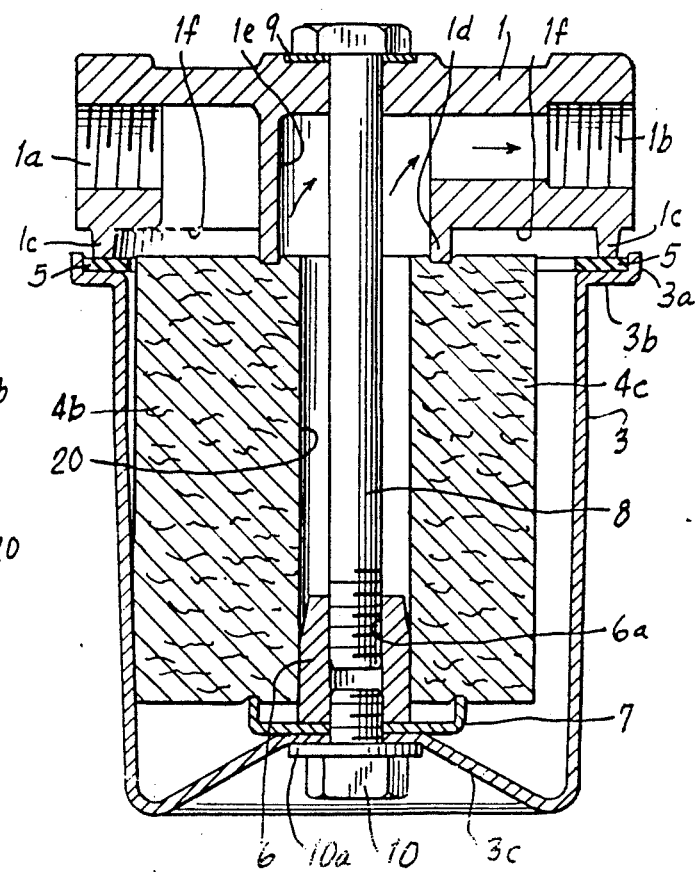

… …

FUEL OIL FILTER ELEMENT

This is a continuation of application Ser. No. 07/148,287, filed Jan. 29, 1988 which was a continuation of application Ser. No. 038,045 filed April 14, 1987, which was a continuation of application Ser. No. 713,299 filed March 18, 1985, which was a continuation-in-part of application Ser. No. 538,267 filed Oct. 3, 1983, all now abandoned.

BACKGROUND OF THE INVENTION

In the usual installation of an oil burner, a fuel filter assembly with a replaceable filter element is employed. This filter assembly is installed in the fuel supply line of the oil burner and all the fuel oil supplied from the storage tank to the oil burner must pass through the filter assembly. The flow of fuel oil is intermittent, since the pump is turned on and off by a thermostat and possibly other controls. It is generally accepted good service practice to replace the filter element yearly. A typical replacement filter element includes a wire mesh tube or spindle on which the filter element, usually a vertical stack of die cut felt washers, is installed. The tube protudes from the upper and lower ends of the stack of felt washers and cooperates with structures on the top and bottom of the filter assembly to align the element within the filter housing. That type of filter element creates many loose particles of filter material which may be shed from the filter and carried along by the filtered fuel. These loose particles may clog the oil burner spray nozzle, which the filter element is designed to protect. This presents the field serviceman with an annoying dilemma, because he may not know that the clogging of the nozzle is caused by material from the filter element.

To maximize the surface open to contact by the incoming fuel, it is common to build the stack with felt washers of alternately large and small outside diameters. While this does increase the filtering surface, it also creates horizontal surfaces that collect dirt and impurities, thereby shortening the effective life of the filter element.

BRIEF SUMMARY OF THE INVENTION

This invention is concerned with a replaceable filter element for filtering a liquid fuel such as oil, as it is supplied to an oil burner by a fuel pump.

The fuel filter element of the present invention is one integral piece of extruded, compressible filter material, cut only at its ends. It includes a portion of annular cross-section defining an axial aperture open at both ends. The periphery of that portion is provided with a plurality of longitudinally extending flutes. All surfaces of the flutes and the periphery of the annular portion are vertical when the filter element is in its operating position. Consequently, any dirt and impurities which collect on those surfaces during operation of the pump fall to the bottom of the sump during the periods when the pump is inactive.

The filter is adapted to be placed in an assembly which includes a housing or top cover, a cylindrical sump casing which fits against the housing and a through bolt extending through the housing and the casing and holding the filter element compressed between them. The housing and the sump casing have central structures which engage the ends of the filter element and hold it centered. The central structure on the housing is a flange encircling a central outlet for the fuel. That flange engages the upper end of the filter element, encircling the axial aperture closely adjacent to the edge of that aperture. The central structure on the sump casing is an upwardly extending post which is received snugly in the axial aperture, closing its lower end.

The sump casing is upwardly convex at its bottom, and the post is mounted at the center of that upwardly convex bottom. The edges of the bottom, near the walls of the casing, are upwardly concave and define a sump in which any particles falling from the vertical surfaces of the filter element are received.

Some of the flutes on the filter element are radially longer than the others. Those longer flutes, or portions of them, engage the wall of the sump casing. Thus, the longer flutes guide the movement of the filter element during assembly.

An object of this invention is a replacement filter element capable of being properly aligned in its sump by means of parallel flutes evenly spaced, protruding from its peripheral surface.

Another object is a replacement filter element that can be manufactured by the extrusion method.

Another object is a replacement filter element that minimizes shedding of filter material into the fuel leaving the filter assembly.

The instant invention overcomes the disadvantages of the conventional stacked washer filter element described above. It also decreases manufacturing costs. Furthermore, it provides a filter element with relatively smooth sides without decreasing the filtering surface open to contact by the incoming fuel.

BRIEF DESCRIPTION OF DRAWINGS

FIG. 1 is a top end view of a filter element embodying the invention.

FIG. 2 is a side elevational view of the filter element of FIG. 1.

FIG. 3 is a top plan view of a filter assembly.

FIG. 4 is a cross-sectional view of the filter assembly of FIG. 3, with the filter element shown in section along the lines 4—4 of FIGS. 1 and 3.

DETAILED DESCRIPTION

FIGS. 1-2

A fuel oil filter element embodying the invention is illustrated by itself in these figures. The filter element is shown at 4, and is generally cylindrical, comprising a portion 4a of annular cross-section with a central axial aperture 20. Twelve flutes, comprising three longer flutes 4b and nine shorter flutes 4c project radially outwardly from the annular portion 4a. The flutes 4b and 4c extend longitudinally of the filter element 4 so that when the filter element is in its normal operating position, as shown in FIG. 2, all the peripheral surfaces of the flutes and of the annular portion 4a are vertical.

The filter element 4 is made of a suitable conventional filter material, e.g., cellulose acetate, extruded continuously in the direction shown as vertical in FIG. 2. After the extrusion, the ends of the filter element are cut at 4d and 4e. The extrusion process results in a thin porous skin on the outer surfaces of the flutes 4b and 4c and the annular portion 4a. The only cut surfaces on the filter element are the end surfaces 4d and 4e.

FIGS. 3–4

These figures illustrate a filter assembly including a housing 1, a sump casing 3 and a filter element 4 enclosed between the housing 1 and the sump casing 3. The housing 1 is connected in the fuel line leading to an oil burner and is supported by that fuel line. The fuel line enters an inlet 1a at one side of the housing 1. Another section of the fuel line is connected to an outlet 1b at the opposite side of the housing 1. The sump casing 3 is of a generally cylindrical configuration, and is open at its upper end. The housing 1 is provided with a downwardly extending flange 1c which is receivable inside a flange 3a formed on the upper end of the sump casing 3. A gasket 5 is located between the bottom surface of the flange 1c and a shoulder 3b in the sump casing 3.

The housing 1 is provided with another downwardly extending flange 1d encircling an opening 1e which communicates with the outlet 1b. The inlet 1a communicates with an annular channel 1f which is open at the bottom and extends around the flange 1d.

The sump casing 3 is tapered downwardly, having a smaller diameter at the bottom than at the top. The bottom end of the sump casing 3 is concave, extending upwardly as shown at 3c.

A center post 6 is threaded on the upper end of a bolt 10 having a flange 10a. A cup 7 is captured between the post 6 and the flange 10a. The bolt 10 and its flange 10a are welded to the concave bottom of the sump casing 3, to the cup 7 and to the post 6, so that all those parts are effectively integral pieces of the casing 3. The casing 3 is tapered at its lower end so that the long radius flutes 4b of the filter element 4 are slightly compressed as the filter element reaches its operating position. Depending on the contour of the casing 3, the long radius flutes 4b may engage the casing 3 for only a portion of the length of the filter element or for the entire length of the filter element. Only three long radius flutes 4b are shown, but the number of such flutes is not critical. Three flutes is the preferred number, since those three flutes provide adequate centering of the filter element in the sump casing. While four or more flutes could be used, those additional flutes might tend to retard the flow of oil around the outside of the filter element 4, and thereby make the pump work harder.

The center post 6 is provided with an internally threaded opening 6a. A bolt 8 extends through the housing 1 and downwardly through the central aperture 20 in the filter element 4 and its lower end is threaded into the upper end of the post 6. The filter element 4 is captured between the flange 1d and the cup 7. The vertical dimension of the element 4 is selected so that it is compressed slightly by the tightening of the bolt 8. The compression is exaggerated in the drawing for purposes of clazity. It can be seen where the end surfaces of the filter element 4 engage the flange 1d and the cup 7.

The tightening of the bolt 8 also compresses the gasket 5 and another gasket 9 between the head of the bolt 8 and the housing 1. The post 6 and the cup 7 are preferably welded to the bottom of the sump casing 3.

When the filter element 4 is in place in the filter assembly, the only surfaces of that filter element which are exposed to the fuel at the downstream side of the assembly are the surface of the aperture 20 and a small annular surface at the upper end of the filter element 4, between the inner periphery of the flange 1d and the edge of aperture 20. The aperture 20 was formed during extrusion of the filter element 4, so that its surface is covered by a skin, and has no cut from which free particles might enter the fuel on the downstream side of the filter element 4. While the small annular surface at the upper end of the filter element 4 is a cut surface, it is very small and the possibility of shedding of particles of material from the filter element 4 into the fuel downstream from the filter is minimized.

The longer flutes 4b engage the sump casing 3 at their tips, at least at the lower ends of the flutes as shown. Depending on the configuration of the casing, this engagement may extend upwardly along the flutes, even to their upper ends. This engagement between the flutes 4b and the casing 3 compresses the flutes slightly and holds the filter element 4 centered in the casing 3.

The upper end of the post 6 has a tapered outer surface of downwardly increasing diameter. This tapered surface engages the aperture 20 in the filter element 4 and assists in the centering of that element in the casing 3. The part of the filter element 4 adjacent the post 6 is slightly compressed by that engagement.

The housing 1 and the sump casing 3, as illustrated in this application, are typical of assemblies manufactured for this purpose. While the forms illustrated are conventional, they may vary considerably in detail from one manufacturer to another. These parts do not form a part of the present invention, except to the extent that the filter elements of the invention are particularly adapted to fit any such assembly providing the axial dimension and the outside diameter of the filter element at the ends of the longer flutes 4b are appropriately selected

I claim:

1. A liquid filter assembly, comprising:
   a cylindrical housing with opposed ends, having at one of said ends an axially located outlet with a periphery and an inlet radially displaced from the outlet; and
   a generally cylindrical one-piece liquid filter element of filter material extruded axially and having opposed ends cut transversely to the direction of extrusion, said element being inserted in said housing and including a portion of annular cross-section encircling and defining an axially extending central aperture and a plurality of peripheral, longitudinally extending flutes projecting radially outward from said portion, at least three of the flutes being equally peripherally spaced and of such radial dimension that they engage the inside of the housing and hold the filter element centered with its central aperture aligned with the outlet, the ends of said annular portion engaging snugly the periphery of the outlet and the end of the housing opposite said one housing end, so that little or not cut filter material is exposed to the downstream side of the flow; said plurality of flutes also including more than three other flutes each having a radial dimension smaller than said first-mentioned at least three flutes such that they are spaced inwardly from the inside of the housing; said element being an integral piece of extruded porous compressible filter material wherein the aperture-defining surface and the external surfaces of said annular portion and said flutes are covered by a skin resulting from extrusion of the element, said skin being in as-extruded condition and having fewer pores than the interior parts of the element, said element being cut only at its said opposed cut ends.

2. A filter assembly as defined in claim 1, wherein said filter element is oriented such that its opposed cut ends are respectively a top end and a bottom end; wherein said housing includes a housing portion forming a top cover for the assembly, said housing portion including said outlet, a flange around said outlet, said inlet, and a peripheral downwardly extending wall, said outlet being downwardly open and said inlet leading to a downwardly opening annular passage encircling said flange; wherein said housing further includes a cylindrical sump casing open at its upper end and closed at its lower end, said upper end having a peripheral wall dimentioned to cooperate with the wall of said housing portion; wherein said housing further includes a post extending upwardly from the center of said lower end and a bolt extending through said housing portion and the outlet and threaded into the post; said flange on said housing portion engaging the top end of the filter element and the lower end of the casing engaging the bottom end of the filter, so that the filter element is compressed vertically between said flange and said lower end, said post being receivable in the lower end of said axial aperture, said flange in said housing portion engaging the top cut end of the filter element closely adjacent the aperture to minimize the possibility of the fragments from the cut ends of the filter element passing into the outlet.

3. A filter assembly as in claim 2, in which the upper end of the post is tapered with a downwardly increasing diameter so as to engage the axial aperture on the filter element, thereby compressing it laterally and centering the filter element in the filter assembly.

4. A filter element as in claim 2, in which the sump casing is tapered at its lower end with a downwardly decreasing diameter, so that it engages and guides the filter element during its movement into the assembly and compresses the filter element laterally, thereby centering it within the assembly and aligning the axial aperture with the post and with the outlet.

* * * * *